United States Patent
Kawasaki et al.

(10) Patent No.: US 12,047,681 B2
(45) Date of Patent: Jul. 23, 2024

(54) IMAGE PICKUP APPARATUS INCLUDING TILT DRIVING PORTION, CONTROL METHOD, AND MEMORY MEDIUM

(71) Applicant: CANON KABUSHIKI KAISHA, Tokyo (JP)

(72) Inventors: Ryo Kawasaki, Kanagawa (JP); Natsuko Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 219 days.

(21) Appl. No.: 17/722,946

(22) Filed: Apr. 18, 2022

(65) Prior Publication Data
US 2022/0345633 A1   Oct. 27, 2022

(30) Foreign Application Priority Data

Apr. 21, 2021 (JP) .................................. 2021-072186
Oct. 29, 2021 (JP) .................................. 2021-177256

(51) Int. Cl.
*H04N 23/67* (2023.01)
*H04N 23/667* (2023.01)

(52) U.S. Cl.
CPC ......... *H04N 23/672* (2023.01); *H04N 23/667* (2023.01); *H04N 23/675* (2023.01)

(58) Field of Classification Search
CPC .................................................. H04N 23/672
See application file for complete search history.

(56) References Cited

U.S. PATENT DOCUMENTS

| | | | |
|---|---|---|---|
| 11,381,731 B2 * | 7/2022 | Chino | H04N 23/675 |
| 11,750,939 B2 * | 9/2023 | Chino | G02B 7/09 |
| 2007/0058046 A1 * | 3/2007 | Kagei | G01S 3/7865 |
| | | | 348/208.14 |

(Continued)

FOREIGN PATENT DOCUMENTS

| | | |
|---|---|---|
| JP | H04-191830 A | 7/1992 |
| JP | H11-038313 A | 2/1999 |

(Continued)

OTHER PUBLICATIONS

Feb. 21, 2023 Japanese Office Action, that issued in Japanese Patent Application No. 2021-177256.

(Continued)

*Primary Examiner* — Cynthia Segura
(74) *Attorney, Agent, or Firm* — Cowan, Liebowitz & Latman, P.C.

(57) ABSTRACT

An image pickup apparatus includes a tilt driving unit configured to change a tilt so as to change an angle between an image pickup plane of an image sensor and a principal plane of an image pickup optical system, a focus driving unit configured to drive a focus lens, and at least one processor that functions as an area setting unit configured to set a plurality of areas in a captured image, a defocus information detection unit configured to detect defocus information for each of the plurality of areas, and a control unit configured to select one control mode from a plurality of control modes based on the defocus information on each of the plurality of areas, the plurality of control modes being used for performing focusing control using at least one of the tilt driving unit and the focus driving unit.

18 Claims, 13 Drawing Sheets

(56) References Cited

U.S. PATENT DOCUMENTS

| | | | | |
|---|---|---|---|---|
| 2008/0111891 A1* | 5/2008 | Kurita | ............... | H04N 23/66 |
| | | | | 348/E5.043 |
| 2015/0160426 A1* | 6/2015 | Chao | ............... | H02K 41/0356 |
| | | | | 359/824 |
| 2016/0173758 A1* | 6/2016 | Kai | ............... | H04N 23/667 |
| | | | | 348/345 |
| 2017/0280045 A1* | 9/2017 | Nonaka | ............... | G03B 15/00 |
| 2020/0064587 A1* | 2/2020 | Yu | ............... | G02B 27/646 |
| 2020/0137293 A1* | 4/2020 | Numata | ............... | G03B 13/32 |
| 2020/0296296 A1 | 9/2020 | Chino et al. | | |
| 2021/0067704 A1 | 3/2021 | Chino et al. | | |
| 2021/0092302 A1 | 3/2021 | Kawasaki | | |
| 2022/0086356 A1* | 3/2022 | Kawasaki | ............... | G06V 10/147 |
| 2022/0303474 A1* | 9/2022 | Kimura | ............... | H04N 23/611 |

FOREIGN PATENT DOCUMENTS

| | | |
|---|---|---|
| JP | 2003-075716 A | 3/2003 |
| JP | 2004-134867 A | 4/2004 |
| JP | 2006-030619 A | 2/2006 |
| JP | 2009-058720 A | 3/2009 |
| JP | 2020-076960 A | 5/2020 |
| JP | 2020-154283 A | 9/2020 |
| JP | 2020154283 A | 9/2020 |
| JP | 2021-033189 A | 3/2021 |

OTHER PUBLICATIONS

European Search Report issued on Sep. 19, 2022, that issued in the corresponding European Patent Application No. 22168949.0.

* cited by examiner

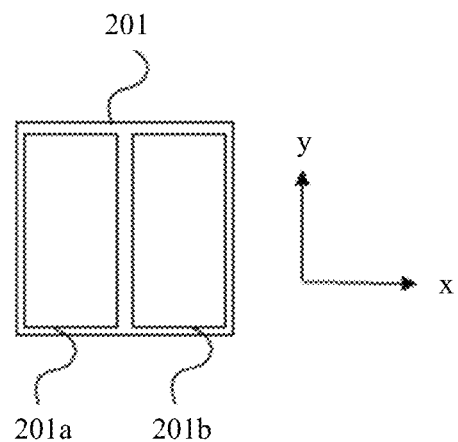
FIG. 2
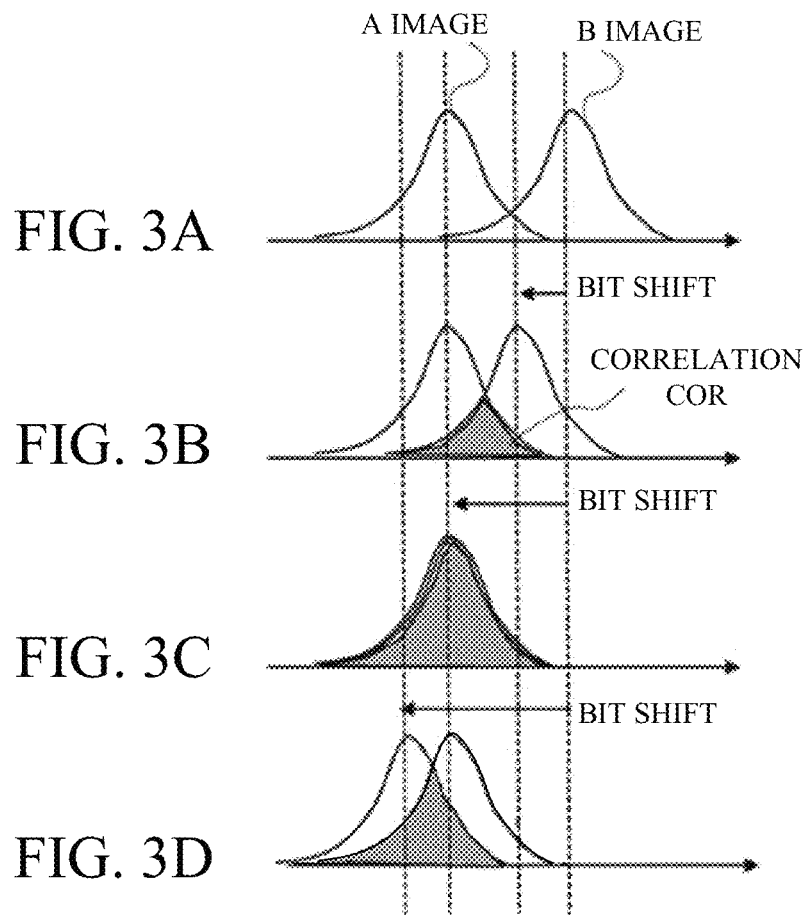
FIG. 3A
FIG. 3B
FIG. 3C
FIG. 3D

| OBJECT Y / OBJECT X | NOT RELIABLE | DEFOCUS DIRECTION IS RELIABLE | DEFOCUS AMOUNT IS RELIABLE | |
|---|---|---|---|---|
| | | | ≥PREDETERMINED AMOUNT | <PREDETERMINED AMOUNT (=IN FOCUS) |
| NOT RELIABLE | FOCUS MODE | FOCUS MODE | FOCUS MODE | TILT MODE |
| DEFOCUS DIRECTION IS RELIABLE | FOCUS MODE | SAME DIRECTION: FOCUS MODE OPPOSITE DIRECTION: TILT MODE | SAME DIRECTION: FOCUS MODE OPPOSITE DIRECTION: TILT MODE | SAME DIRECTION: FOCUS MODE OPPOSITE DIRECTION: TILT MODE |
| DEFOCUS AMOUNT IS RELIABLE ≥PREDETERMINED AMOUNT | FOCUS MODE | SAME DIRECTION: FOCUS MODE OPPOSITE DIRECTION: TILT MODE | FOCUS-TILT CALCULATION MODE | FOCUS-TILT CALCULATION MODE |
| DEFOCUS AMOUNT IS RELIABLE <PREDETERMINED AMOUNT (=IN FOCUS) | TILT MODE | SAME DIRECTION: FOCUS MODE OPPOSITE DIRECTION: TILT MODE | FOCUS-TILT CALCULATION MODE | END |

FIG. 6

| OBJECT Y \ OBJECT X | NOT RELIABLE | DEFOCUS DIRECTION IS RELIABLE | DEFOCUS AMOUNT IS RELIABLE ≥PREDETERMINED AMOUNT | DEFOCUS AMOUNT IS RELIABLE <PREDETERMINED AMOUNT (=IN FOCUS) |
|---|---|---|---|---|
| NOT RELIABLE | FOCUS MODE | FOCUS MODE | FOCUS MODE | FOCUS MAINTENANCE TILT MODE |
| DEFOCUS DIRECTION IS RELIABLE | FOCUS MODE | SAME DIRECTION: FOCUS MODE OPPOSITE DIRECTION: TILT MODE | SAME DIRECTION: FOCUS MODE OPPOSITE DIRECTION: TILT MODE | FOCUS MAINTENANCE TILT MODE |
| DEFOCUS AMOUNT IS RELIABLE ≥PREDETERMINED D AMOUNT | FOCUS MODE | SAME DIRECTION: FOCUS MODE OPPOSITE DIRECTION: TILT MODE | FOCUS-TILT CALCULATION MODE | FOCUS-TILT CALCULATION MODE |
| DEFOCUS AMOUNT IS RELIABLE <PREDETERMINED D AMOUNT (=IN FOCUS) | FOCUS MAINTENANCE TILT MODE | FOCUS MAINTENANCE TILT MODE | FOCUS-TILT CALCULATION MODE | END |

FIG. 11

IMAGE PICKUP APPARATUS INCLUDING TILT DRIVING PORTION, CONTROL METHOD, AND MEMORY MEDIUM

BACKGROUND OF THE INVENTION

Field of the Invention

The present disclosure relates to an image pickup apparatus capable of tilt control.

Description of the Related Art

In recent years, image pickup apparatuses have been installed for a purpose of security or at places such as factory lanes. Such an image pickup apparatus is required to acquire an image having a deep depth of field. A technology called the Scheimpflug principle has been known that adjusts a focal plane by tilting an image pickup plane with respect to a plane orthogonal to an image pickup optical axis for capturing an image of an object, i.e., by performing tilt control, so as to deepen the depth of field of an image pickup scene.

Japanese Patent Application Laid-Open No. ("JP") 2003-75716 discloses an image pickup apparatus that detects respective in-focus positions of a plurality of objects based on contrast evaluation values and determines a focus position and a tilt control amount such that the plurality of objects becomes in focus. JP 2020-154283 discloses an image pickup apparatus that includes a plurality of control modes each of which controls at least one of a focus position and a tilt angle and focuses on a plurality of objects by selecting one of the plurality of control modes based on the number of objects. By applying an image pickup plane phase difference method, each of these techniques can detect the defocus amount immediately and is expected to perform faster focusing.

However, in a case where the image pickup apparatus disclosed in JP 2003-75716 or JP 2020-154283 is used, control based on contrast evaluation values may temporarily make an object out of focus during a process of detecting a plurality of in-focus positions or may take some time to acquire an in-focus state. In JP 2003-75716 and JP 2020-154283, a point is not taken into consideration that a highly accurate defocus amount is not always detected when the image pickup plane phase difference method is used, and a control method in a case where the image pickup plane phase difference method is used is not disclosed.

SUMMARY OF THE INVENTION

The present invention provides an image pickup apparatus that can focus on a plurality of objects at high speed and with high accuracy by performing optimum focusing control based on defocus information on the plurality of objects.

An image pickup apparatus according to one aspect of embodiments of the disclosure includes a tilt driving unit configured to change a tilt of at least one of an image sensor and an image pickup optical system so as to change an angle between an image pickup plane of the image sensor and a principal plane of the image pickup optical system, a focus driving unit configured to drive a focus lens of the image pickup optical system, at least one processor, and at least one memory coupled to the at least one processor storing instructions that, when executed by the at least one processor, cause the at least one processor to function as, an area setting unit configured to set a plurality of areas in a captured image, a defocus information detection unit configured to detect defocus information for each of the plurality of areas, and a control unit configured to select one control mode from a plurality of control modes based on the defocus information on each of the plurality of areas, the plurality of control modes being used for performing focusing control using at least one of the tilt driving unit and the focus driving unit.

A control method of an image pickup apparatus corresponding to the above image pickup apparatus and a storage medium storing a computer program that enables a computer to execute the control method also constitute another aspect of the embodiments.

Further features of the present invention will become apparent from the following description of exemplary embodiments with reference to the attached drawings.

BRIEF DESCRIPTION OF THE DRAWINGS

FIG. 2 is a diagram illustrating a pixel configuration of an image sensor.

FIGS. 3A to 3D are diagrams illustrating a calculation method for a bit shift amount.

FIG. 6 is a list of controls based on defocus information and its reliability according to a first embodiment.

FIG. 11 is a list of control based on defocus information and its reliability according to a second embodiment.

DESCRIPTION OF THE EMBODIMENTS

Referring now to the accompanying drawings, a detailed description will be given of embodiments of the present disclosure.

Entire Configuration

Figure 1:
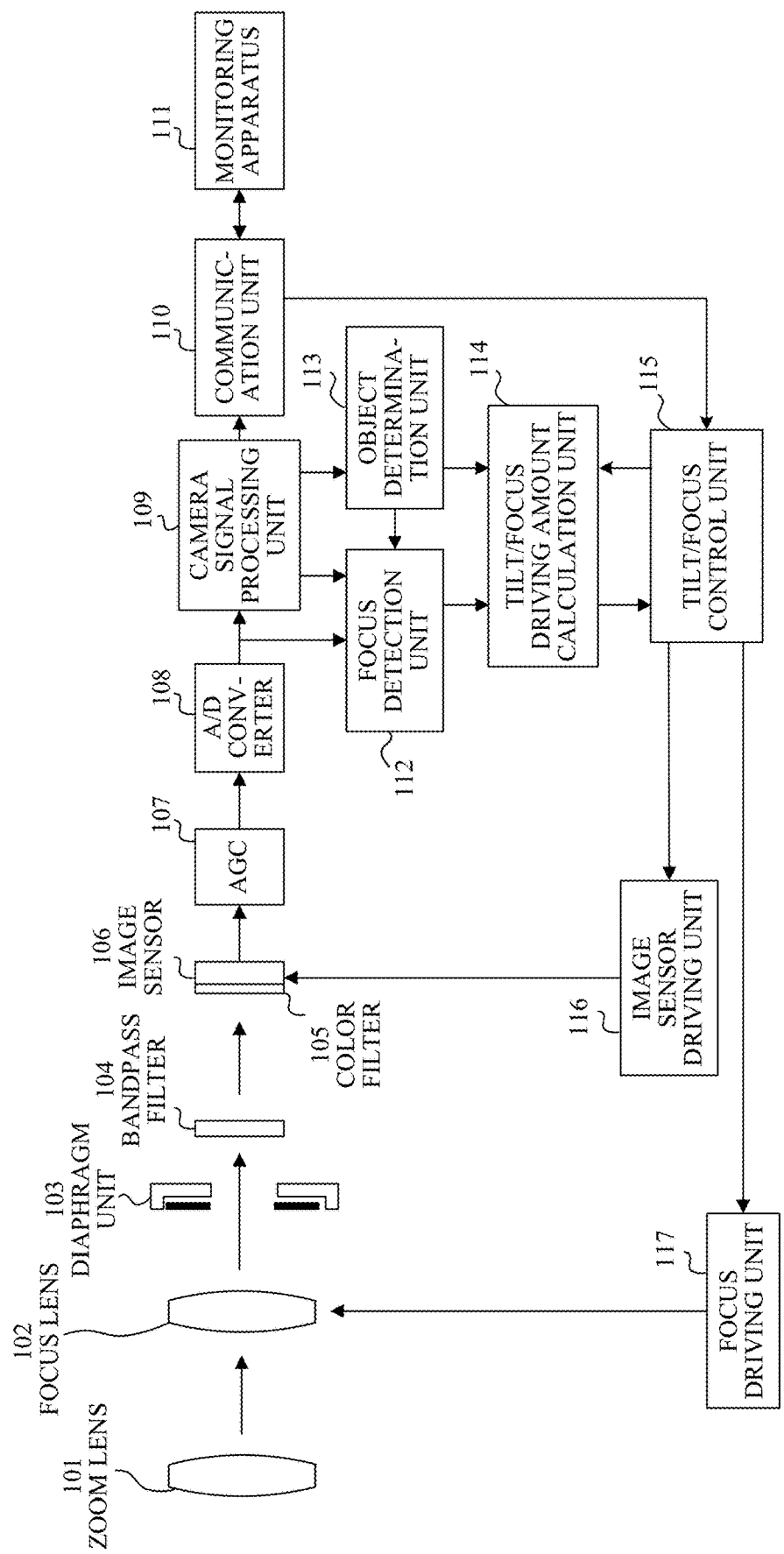
FIG. 1 is a block diagram illustrating a configuration of an image pickup apparatus.

FIG. 1 is a block diagram illustrating a configuration of an image pickup apparatus according to the embodiments. A lens unit as an image pickup optical system includes a zoom lens 101 that moves in an optical axis direction to change a focal length, a focus lens 102 that moves in the optical axis direction to control a focus, and a diaphragm unit 103 that adjusts a light amount.

Light passing through the image pickup optical system forms an object image as an optical image on an image sensor 106 via a bandpass filter (BPF) 104 and a color filter 105. The BPF 104 may be capable of advancing in and retracting from an optical path of the image pickup optical system. The image sensor 106 photoelectrically converts the object image into an image pickup signal. An analog electric signal (image pickup signal) output from the image sensor 106 is subjected to gain adjustment by an auto-gain control (AGC) 107, converted into a digital image pickup signal by an A/D converter 108, and input to a camera signal processing unit 109.

The camera signal processing unit 109 performs various image processing (for example, gamma processing and white balance adjustment) on the digital image pickup signal to generate an image signal. A captured image can be displayed by displaying this image signal as an image on a display unit (not illustrated). The image signal is output to a monitoring apparatus 111 connected to the image pickup apparatus by wired or wireless communication via a communication unit 110. The communication unit 110 receives a command from an external control apparatus such as an external PC and transmits a control signal such as a command to a tilt/focus control unit (control unit) 115 in the image pickup apparatus.

In this embodiment, a system including the monitoring apparatus 111 is referred to as an image pickup apparatus. Units other than the monitoring apparatus 111 in FIG. 1 are housed in one housing and included in a monitoring camera.

A focus detection unit (defocus information detection unit) 112 performs focus detection by a phase difference detection method by using focus detection data acquired for each target object area from the camera signal processing unit 109. More specifically, the camera signal processing unit 109 generates, as focus detection data, a pair of image data formed from a light beam passing through a pair of pupil areas of the image pickup optical system. The focus detection unit 112 detects a defocus amount, a defocus direction, their reliability, and the like based on a shift amount between the pair of image data. That is, the focus detection unit 112 performs focus detection by an image pickup plane phase difference method based on the output from the image sensor 106 without using a dedicated AF sensor. A detailed description is given below of the focus detection operation by the image pickup plane phase difference method performed by the focus detection unit 112.

An object determination unit (area setting unit) 113 detects a specific object in the captured image by using image recognition on the image signal output from the camera signal processing unit 109. The specific object is an object arbitrarily designated by a user or set as a default in advance and is, for example, a person, a face, a car, etc.

Defocus information output from the focus detection unit 112 and object information output from the object determination unit 113 are input to a tilt/focus driving amount calculation unit 114. The tilt/focus driving amount calculation unit 114 calculates a tilt angle and a focus position that are optimum for a scene by using the defocus information, the object information, and a tilt angle and a focus position output from a tilt/focus control unit 115. The calculated tilt angle and focus position are transmitted to the tilt/focus control unit 115, and the tilt/focus control unit 115 controls the tilt angle and the focus position. The tilt/focus control unit 115 includes a built-in CPU as a computer and, as a control unit, executes various operations on the entire apparatus according to a computer program stored in a memory (not illustrated). The tilt/focus control unit 115 performs focusing control by AF or manual focus (MF) based on an instruction acquired from an external control apparatus such as an external PC via the communication unit 110. The tilt/focus control unit 115 receives current position information output from an image sensor driving unit 116 and a focus driving unit 117 and transmits the current position information to the tilt/focus driving amount calculation unit 114. The tilt/focus control unit 115 transmits the tilt angle and the focus position calculated by the tilt/focus driving amount calculation unit 114 to the image sensor driving unit 116 and the focus driving unit 117 so as to indicate driving positions.

The image sensor driving unit 116 functions as a tilt driving unit and tilts the image sensor 106 based on the tilt angle indicated by the tilt/focus control unit 115. That is, the image sensor driving unit 116 tilts the image sensor 106 to change a tilt angle that is an angle between an image pickup plane of the image sensor 106 and a principal plane of the image pickup optical system. In this embodiment, a rotational axis of a tilt of the image sensor 106 is a horizontal axis passing through a center of the captured image, i.e., an axis along a longitudinal direction of the image sensor 106. The image sensor 106 is tilted relative to the image pickup optical system about the rotational axis. In tilt control, instead of the image sensor 106, some lenses of the image pickup optical system may be tilted relative to the image sensor 106.

The focus driving unit 117 controls a position of the focus lens 102 based on a set focus position indicated by the tilt/focus control unit 115.

Description of Focus Detection Operation by Image Pickup Plane Phase Difference Method A description will be given of a pixel configuration of the image sensor 106 with reference to FIG. 2. FIG. 2 is a pixel configuration diagram of the image sensor 106.

In the image sensor 106, every pixel 201 is divided in an X direction into two, photoelectric conversion units 201a and 201b. It is possible to separately read, from the image sensor 106, respective photoelectric conversion signals output from the photoelectric conversion units 201a and 201b and a sum of the photoelectric conversion signals output from the two photoelectric conversion units 201a and 201b.

By subtracting the photoelectric conversion signal output from one photoelectric conversion unit (for example, the photoelectric conversion unit 201a) from the sum of the photoelectric conversion signals output from the two photoelectric conversion units 201a and 201b, it is possible to acquire a signal corresponding to the photoelectric conversion signal output from the other photoelectric conversion unit (photoelectric conversion unit 201b). The respective photoelectric conversion signals output from the photoelectric conversion units 201a and 201b are used as focus detection data in phase difference AF. The sum of the photoelectric conversion signals output from the two photoelectric conversion units 201a and 201b is used as normal captured image data.

The focus detection unit 112 performs correlation calculation to acquire a relative image shift amount between an A image and a B image generated as described above. As a result, the focus detection unit 112 can detect a bit shift amount [bit] that is a correlation degree of the pair of image signals. By multiplying the bit shift amount by a conversion coefficient, the bit shift amount is converted into a defocus amount [mm] of a predetermined area.

This embodiment reads, from each pixel of the image sensor 106, an output signal from one of the photoelectric conversion units 201a and 201b and the sum of the output signals from the two photoelectric conversion units 201a and 201b. For example, in a case where the output signal from the photoelectric conversion unit 201a and the sum of the output signals from the photoelectric conversion unit 201a and 201b is read, the output signal from the photoelectric conversion unit 201b can be acquired by subtracting, from the sum of the output signals from the photoelectric conversion unit 201a and 201b, the output signal from the photoelectric conversion unit 201a. As a result, it is possible to acquire both the A image and B image and to realize focus detection by the image pickup plane phase difference method. In general, the sum of the output signals from the photoelectric conversion units 201a and 201b forms one pixel of an output image, i.e., one output pixel. Such an image sensor is generally known as disclosed in JP 2004-134867, and thus a detailed description thereof is omitted.

Next, a description will be given of the focus detection operation by the image pickup plane phase difference method. The focus detection operation described below is mainly executed by the focus detection unit 112. The focus detection unit 112 sets a focus detection position. Thereafter, the focus detection unit 112 reads the focus detection data from the set focus detection position. By using the signals read from the pixels in the focus detection position set by the focus detection unit 112, the focus detection unit 112 generates signals of the A image and the B image, respectively. Next, the focus detection unit 112 detects a bit shift amount P [bit] by acquiring, by performing correlation calculation, the relative image shift amount between the A image and the B image.

An example of a correlation calculation method will be described with reference to FIGS. 3A to 3D. FIGS. 3A to 3D are explanatory diagrams illustrating the correlation calculation method, which is a calculation method for a bit shift amount. In FIGS. 3A to 3D, a vertical axis indicates a signal value and a horizontal axis indicates a bit (position).

It is assumed that the signals of the A image and the B image are read from a pixel (focus detection pixel) of the image sensor 106. The camera signal processing unit 109 performs digital filtering on each of the A image and the B image in order to reduce noise. FIG. 3A illustrates a state after the filtering. As illustrated in FIGS. 3A to 3D, the focus detection unit 112 calculates correlation amounts COR while bit-shifting either the A image signal or the B image signal or both the A image signal and the B image signal. A correlation amount COR is an area in which the A image and the B image overlap, a value acquired by subtracting an area of the B image from an area of the A image, a calculated value representing a correlation degree, or the like but is not limited to these. Hereinafter, a description will be given of a case where the correlation amount COR is the area in which the A image and the B image overlap.

If the A image and the B image match, the area in which the A image and the B image overlap is large, and thus the correlation becomes the highest, and the correlation amount COR is large. Here, the shift amount [bit] when the correlation amount COR takes the maximum value is a bit shift amount P [bit].

Next, the focus detection unit 112 acquires a conversion coefficient K. A defocus amount DEF is acquired by multiplying the conversion coefficient K by the bit shift amount P.

Figure 4:
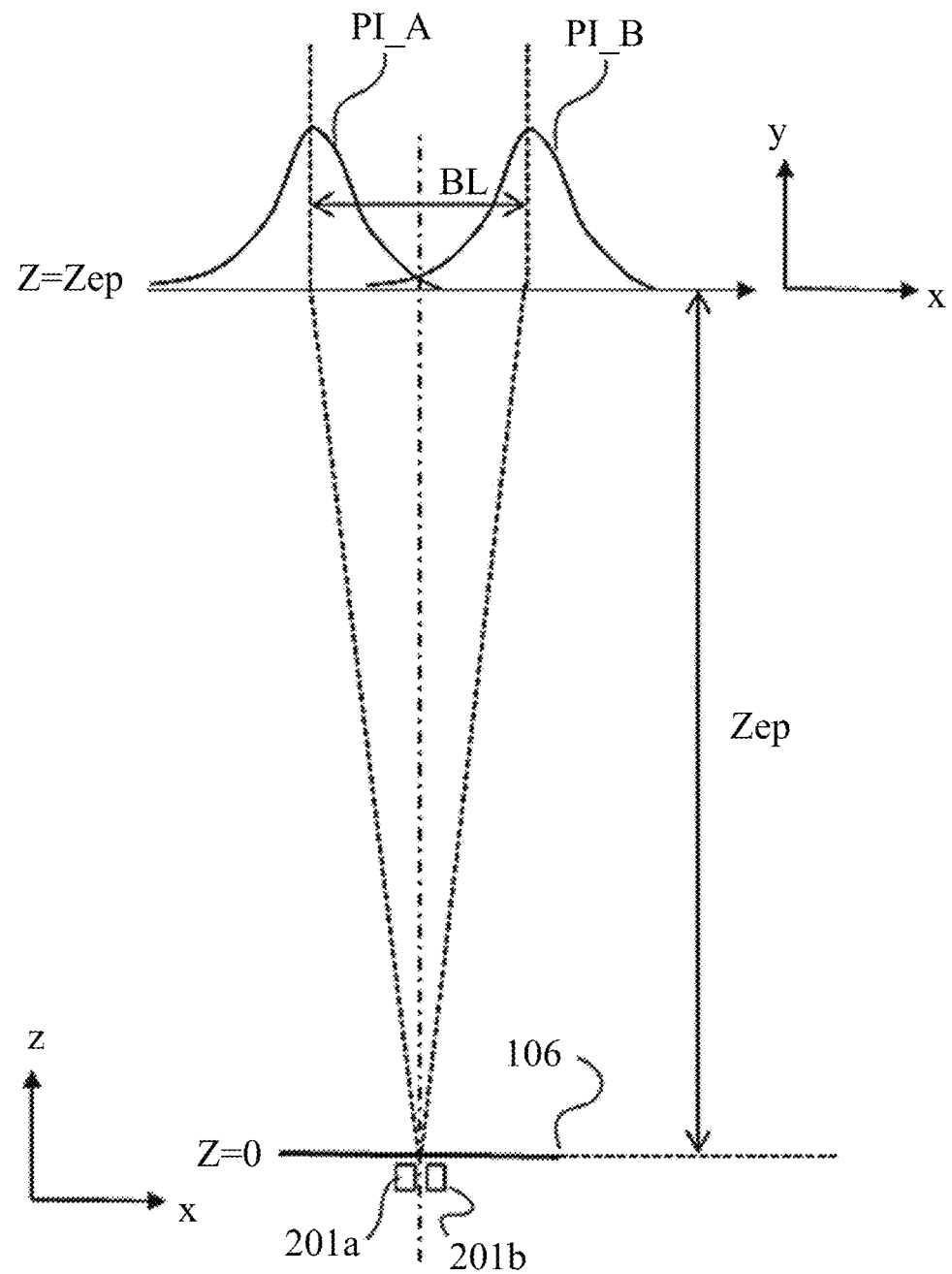
FIG. 4 is a diagram illustrating a calculation method for a conversion coefficient K.

Calculation of the conversion coefficient K will be described with reference to FIG. 4. FIG. 4 is an explanatory diagram illustrating the calculation of the conversion coefficient K. In FIG. 4, a Z axis indicates an optical axis direction of the image pickup optical system, and Z=0 indicates a plane of the image sensor 106, i.e., the image pickup plane.

Zep indicates an exit pupil distance. A pupil intensity distribution PI_A and a pupil intensity distribution PI_B, which are light amount distributions of focus detection light beams of the A image and the B image on Z=Zep, are projection images on an exit pupil plane of the focus detection signals respectively output from the photoelectric conversion units 201a and 201b.

PI_A and PI_B in FIG. 4 indicate one-dimensional pupil intensity distributions. A distance between centers of gravity of the pupil intensity distributions PI_A and PI_B is defined as a base length BL. A ratio of the exit pupil distance Zep to the base length BL indicates a variation amount [mm] in the optical axis direction for the bit shift amount [bit] between the A image and the B image.

Therefore, the conversion coefficient K can be expressed by the following equation (1).

$$K = Zep/BL \quad (1)$$

Next, the focus detection unit 112 calculates the defocus amount DEF [mm] using the following equation (2).

$$DEF = P \times K \quad (2)$$

The focus detection unit 112 determines the reliability of the defocus amount. For example, the focus detection unit 112 makes the determination on the reliability based on a matching degree of the A image and the B image (hereinafter referred to as a two-image matching level). If the A image signal and the B image signal have high contrasts and the A image and the B image signals are similar in shape, i.e., if the two-image matching level is high, or if a main object is in focus, the focus detection unit 112 determines that the state is such that the reliability is high, that is, the defocus amount is reliable.

If the two-image matching level is lower than a predetermined value but the correlation acquired by relatively shifting the A image signal and the B image signal has a certain tendency, the focus detection unit 112 determines that the state is such that the defocus amount is not reliable but the defocus direction is reliable. This determination is often made, for example, in a state where the main object is slightly out of focus.

If none of the above applies to the state, the focus detection unit 112 determines that the state is such that neither the defocus amount nor the defocus direction are reliable. This determination is often made, for example, in a state where the contrasts of the A image signal and the B image signal are low, the two-image matching level is low, and the object is greatly out of focus.

Description of Tilt Control

Figure 5A:
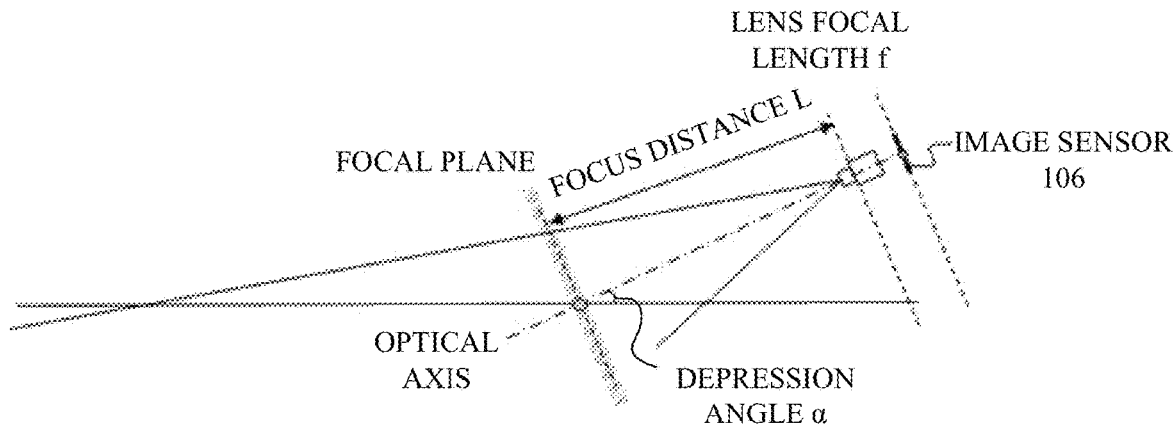
FIGS. 5A to 5C are diagrams illustrating tilt control.
Figure 5B:
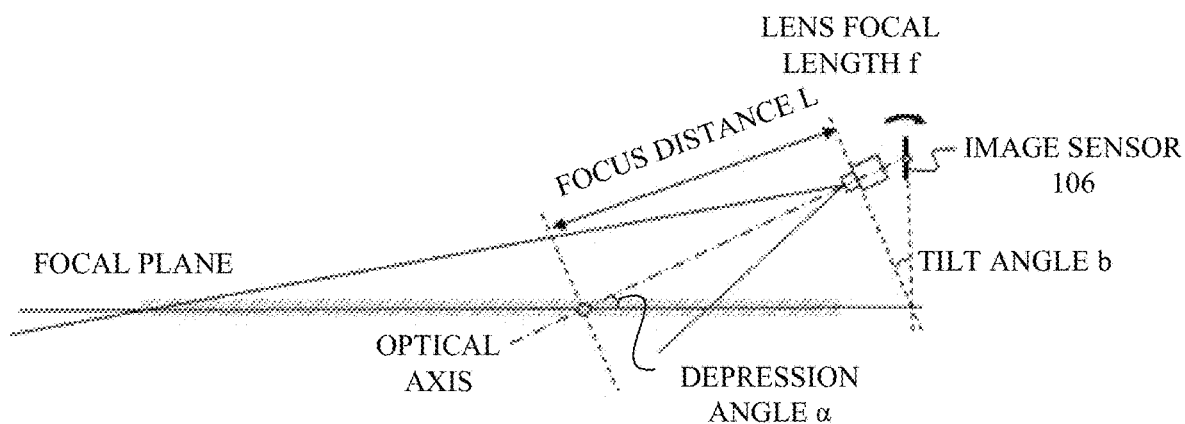
Figure 5C:
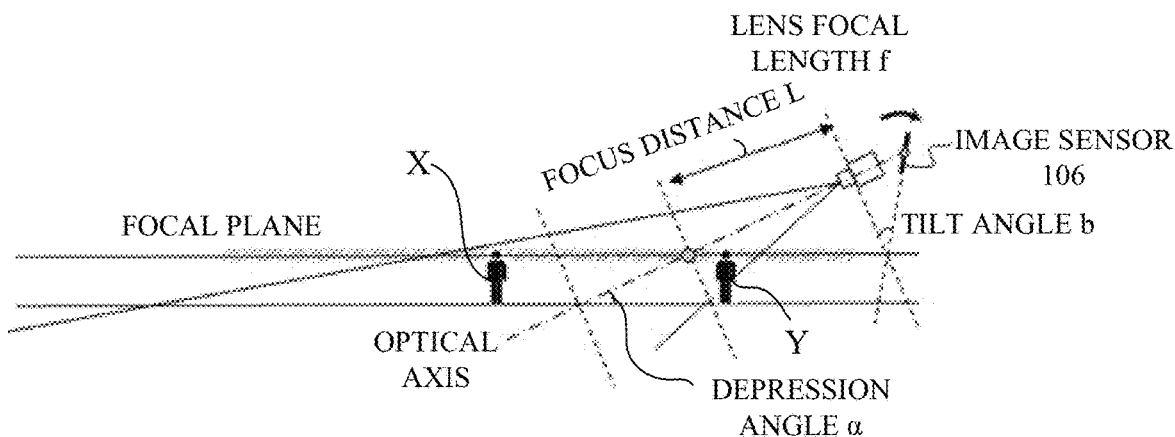

The tilt control will be described with reference to FIGS. 5A to 5C. FIGS. 5A to 5C are explanatory diagrams illustrating the tilt control. FIG. 5A illustrates a state in which the optical system (image pickup optical system) and the image sensor 106 are parallel to each other. A focus distance L is in focus, and the focal plane is parallel to each of the optical system and the image sensor 106. FIG. 5B illustrates a state in which the tilt control has been performed on the state illustrated in FIG. 5A by rotating the image sensor 106 about an image sensor rotational axis. When the tilt control is performed, the focal plane also rotates about a focal plane rotational axis corresponding to the image sensor rotational axis, according to the Scheimpflug principle. Thereby, it is possible to focus on all objects from a short distance to a long distance on a certain plane. According to the Scheimpflug principle, when the principal plane of the optical system and the image pickup plane of the image sensor 106 intersect on one straight line, the focal plane also intersects them on the same straight line.

A tilt angle b is calculated by the following equation (3) according to the Scheimpflug principle where f represents a focal length, L represents a focus distance, and a represents a depression angle.

$$b = \tan^{-1}(f/(L \tan \alpha)) \quad (3)$$

FIG. 5C illustrates a scene in which an object X and an object Y exist. In this scene, the focal plane may be controlled so that faces of the objects X and Y are in focus as illustrated in FIG. 5C. Hereinafter, "object" includes a part of the object such as the face of the object. Therefore, in addition to the tilt control, focus control in which the focus lens 102 is driven may be performed. An optimum focal plane (that is, an optimum tilt angle and an optimum focus position) is different depending on the object, and thus it is difficult for the user to manually adjust the focus. Therefore, the tilt/focus control unit 115 automatically performs the focusing control to make the tilt angle and the focus position optimum so that the focal plane becomes a focal plane such that both the two objects X and Y are in focus.

FIRST EMBODIMENT

Hereinafter, a description will be given of a process executed by the image pickup apparatus according to the first embodiment. The image pickup apparatus according to the first embodiment has three focus control modes (control mode) including a focus mode (first mode), a tilt mode (second mode), and a focus-tilt calculation mode (third mode).

In the focus mode, control is performed such that an object is focused on by driving the focus lens 102. In the tilt mode, control is performed such that the object is focused on by performing tilt driving of the image sensor 106. In the focus-tilt calculation mode, control is performed such that the object is focused on based on target values respectively calculated for the focus position and the tilt angle. Based on the defocus information detected for each object by the focus detection unit 112 and its reliability, the tilt/focus control unit 115 performs the focusing control on two objects while selecting an optimum focus control mode.

A specific description will be given of the control methods according to this embodiment. FIG. 6 is a list of control based on defocus information on each of two objects X and Y and its reliability.

Figure 7:
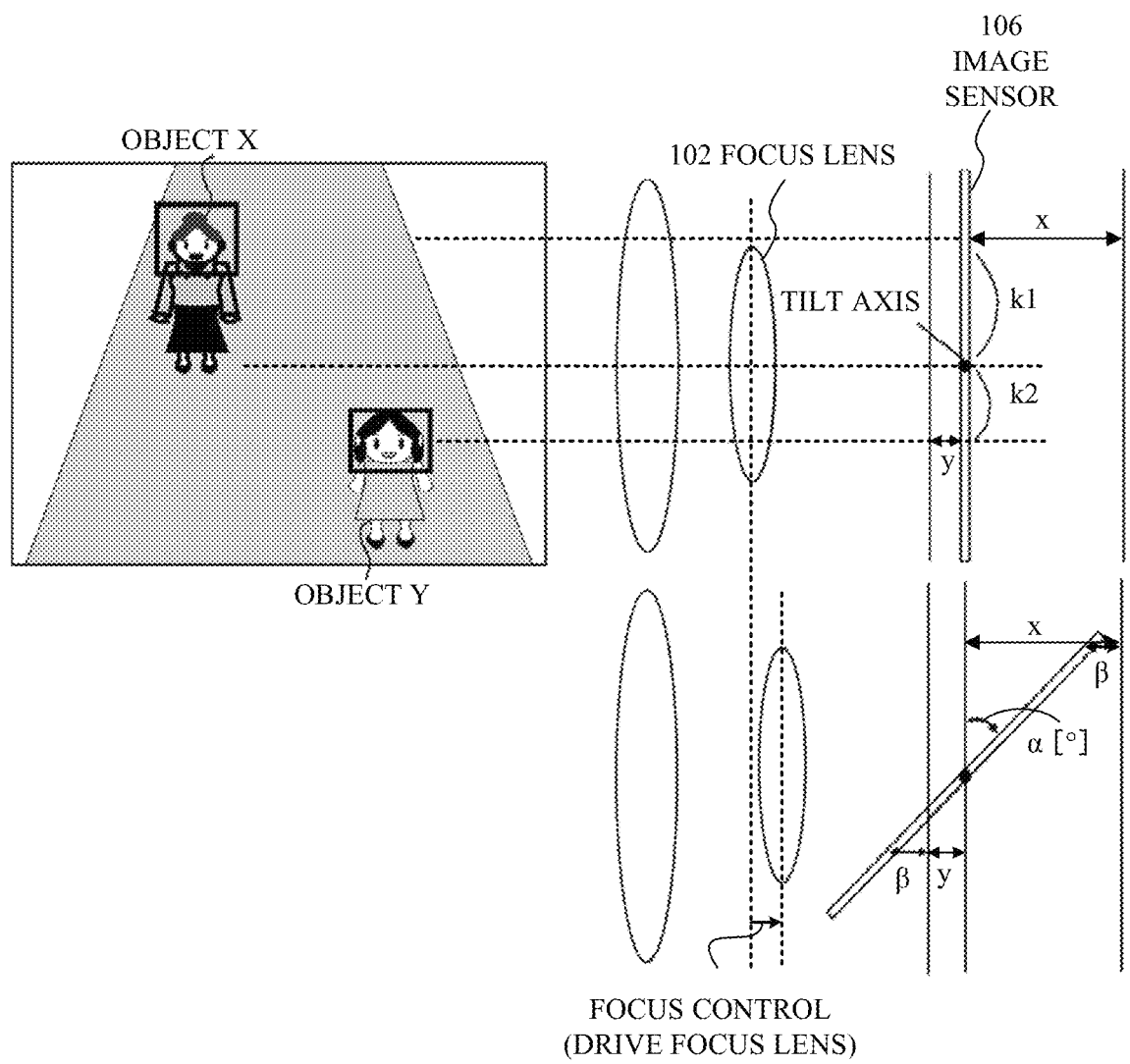
FIG. 7 is a diagram illustrating a focus-tilt calculation mode.

If the defocus amounts of the two objects X and Y are both reliable, the tilt/focus control unit 115 performs the focusing control in the focus-tilt calculation mode. An example of calculating the tilt angle and the focus position in the focus-tilt calculation mode will be described with reference to FIG. 7. FIG. 7 is an explanatory diagram illustrating the focus-tilt calculation mode. As target objects, the object X and the object Y exist as in FIG. 5C. A relationship between a current tilt angle and a position of the focus lens 102 is a positional relationship illustrated in an upper part of FIG. 7. x indicates a defocus amount on the focal plane for focusing on the object X, and y indicates a defocus amount on the focal plane for focusing on the object Y. k1 [μm] indicates a distance from a tilt axis to the object X on the image sensor 106, and k2 [μm] indicates a distance from the tilt axis to the object Y on the image sensor 106.

The following equations (4) and (5) are established where $\alpha[°]$ represents a tilt angle for focusing on the objects X and Y, and $\beta$ represents a focus correction amount of the focus lens 102 on the focal plane.

$$x - \beta = k1 \times \tan \alpha + \beta \quad (4)$$

$$y = k2 \times \tan \alpha - \beta \quad (5)$$

When the simultaneous equations (4) and (5) are solved, the tilt angle a and the focus correction amount β are expressed by the following equations (6) and (7), respectively.

$$\alpha = \tan^{-1}((x+y)/(k1+k2)) \quad (6)$$

$$\beta = (k2 \cdot x - k1 \cdot y)/(k1+k2) \quad (7)$$

The driving amount of the focus lens 102 can be simply calculated by dividing the focus correction amount β by sensitivity FS of the focus lens 102.

On the other hand, the driving amount of the focus lens 102 can be accurately calculated by solving higher-order equations or polynomials based on the sensitivity FS. However, this embodiment is not limited to this, and the driving amount may be calculated by another method.

Thus, if both the defocus amounts (x and y) of the two objects X and Y are reliable, the tilt angle and the focus position can be calculated, and the objects X and Y can be focused on quickly. If the defocus amounts of the two objects X and Y are less than a predetermined value, it can be determined that the two objects have been focused on, and the process ends.

Next, a description will be given of a case in which both the defocus amounts of the two objects X and Y are not reliable. If both defocus directions of the two objects are reliable, the tilt/focus control unit 115 selects the focus mode or the tilt mode depending on the defocus directions. If the defocus directions match, i.e., the defocus directions are the same direction, the tilt/focus control unit 115 performs control in the focus mode because, by driving the focus lens 102, the focus is controlled in a direction such that both the objects X and Y become in focus. On the other hand, if the defocus directions do not match, i.e., the defocus directions are opposite directions, the tilt/focus control unit 115 performs control in the tilt mode because, by performing tilt driving of the image sensor 106, the focus can be controlled in a direction such that both the objects X and Y become in focus.

If neither the defocus amount nor the defocus direction of the object X or Y is reliable, the tilt/focus control unit 115 performs control in the focus mode or the tilt mode. If the defocus amount or the defocus direction of one of the objects X and Y is reliable, the tilt/focus control unit 115 performs control in the focus mode or the tilt mode in a direction such that the one object becomes in focus. If the defocus amounts or the defocus directions of both the objects X and Y are not reliable, the tilt/focus control unit 115 performs control in the focus mode or the tilt mode in a predetermined direction. In these cases, by acquiring, during the control, a defocus variation and a contrast variation of the object whose defocus direction is not reliable, the focus detection unit 112 can determine the defocus direction. In this embodiment, if the defocus direction of one object is reliable and the one object is in focus, the tilt/focus control unit 115 selects the tilt mode, and otherwise, the tilt/focus control unit 115 selects the focus mode. By performing the control in different ways as described above, this embodiment increases the focus variation of the other object to make it easy to acquire the defocus variation and the contrast variation.

Figure 8:
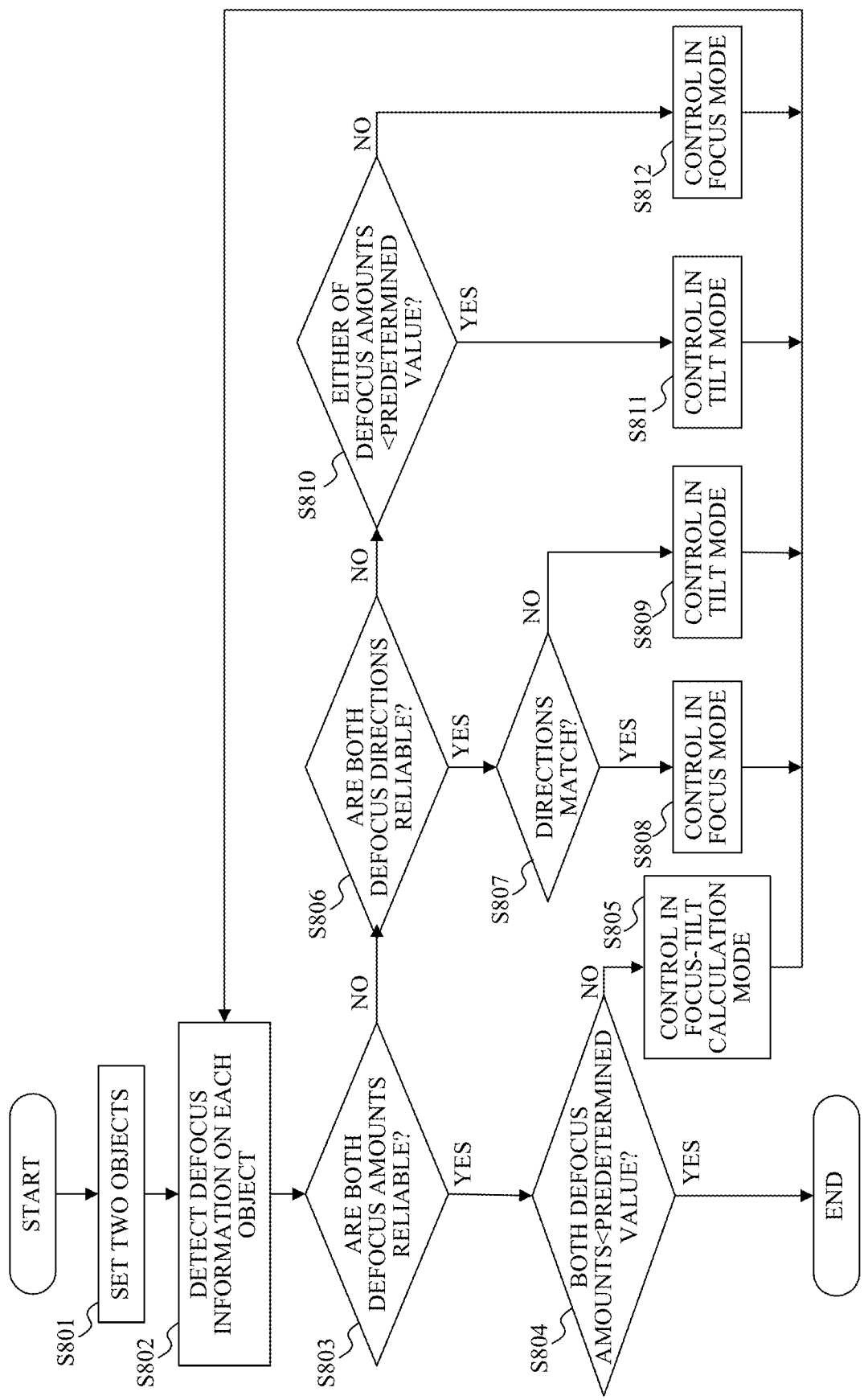
FIG. 8 is a flowchart of a process according to the first embodiment.

FIG. 8 is a flowchart illustrating the above-described process according to this embodiment.

In step S801, the object determination unit 113 sets two objects (areas). The two objects may be automatically set by face detection, automatic detection, or the like or may be designated by the user.

In step S802, the focus detection unit 112 detects the defocus information (the defocus amount and the defocus direction) for each object set in step S801 and determines its reliability, that is, determines whether or not the defocus amounts and the defocus directions are reliable.

In step S803, the focus detection unit 112 determines whether or not both of the defocus amounts detected for the two objects are reliable. If both are reliable, the process proceeds to step S804. In step S804, the focus detection unit 112 determines whether or not both of the defocus amounts are smaller than a predetermined value. If both are smaller than the predetermined value, it can be determined that the two objects are in focus, and the process ends. If either or both of the defocus amounts are equal to or larger than the predetermined value, the process proceeds to step S805. In step S805, the tilt/focus control unit 115 performs control in the focus-tilt calculation mode that calculates respective target values of the focus position and the tilt angle and performs the focusing control on the two objects based on the target values. Thereafter, the process returns to step S802 again.

If the determination result in step S803 is "no", the process proceeds to step S806. In step S806, the focus detection unit 112 determines whether or not both of the defocus directions detected for the two objects are reliable. If both the defocus directions are reliable, the process proceeds to step S807. In step S807, the focus detection unit 112 determines whether or not the detected defocus directions match. If the detected defocus directions match, the process proceeds to step S808, and the tilt/focus control unit 115 performs control in the focus mode. If the detected defocus directions do not match, the process proceeds to step S809, and the tilt/focus control unit 115 performs control in the tilt mode. Thereafter, the process returns to step S802 again. As the tilt/focus control unit 115 continues to perform the control in the in-focus direction in the focus control mode of step S808 or step S809, it gradually becomes possible to acquire a reliable defocus amount of each object, and a determination result of "yes" becomes more likely to be acquired in step S803.

If the determination result in step S806 is "no", the process proceeds to step S810, and the focus detection unit 112 determines whether or not the defocus amount of either of the two objects is smaller than a predetermined value. That is, the focus detection unit 112 determines whether or not there is an in-focus object. If there is an in-focus object, the process proceeds to step S811, and the tilt/focus control unit 115 performs control in the tilt mode. If there is no in-focus object, the process proceeds to step S812, and the tilt/focus control unit 115 performs control in the focus mode. Thereafter, the process returns to step S802 again. As the tilt/focus control unit 115 continues to perform the control in the in-focus direction in the focus control mode of step S811 or step S812, it gradually becomes possible to acquire a reliable defocus amount of each object. In addition, a defocus direction can be acquired by acquiring a defocus variation and a contrast variation. As a result, a determination result of "yes" becomes more likely to be acquired in step S803 or step S806.

In the first embodiment described above, the defocus information on the two objects is detected, and the focusing control is performed while, based on the reliability of the defocus information, the mode is switched between the three focus control modes of the focus mode, the tilt mode, and the focus-tilt calculation mode. If the defocus amounts of the two objects are reliable, the focus control is performed at a high speed in the focus-tilt calculation mode, and if either or both of the defocus amounts of the two objects are not reliable, an optimum mode is selected from the focus mode and the tilt mode based on the defocus directions of the two objects, which makes it possible to perform the focusing control for the two objects at a higher speed and with higher accuracy. In the first embodiment, in order that the two objects are certainly focused on, the focusing control is ended when both the defocus amounts are smaller than the predetermined value. Alternatively, for example, the focusing control may be ended when a predetermined time has elapsed since the focusing control is started. Alternatively, the focusing control may be ended according to the number of inversions of the focus driving or the tilt driving. In addition to these, various modifications are available as the process of ending the focusing control.

In this embodiment, the case where the number of the plurality of objects is two is described, but the number of objects may be three or more.

For example, in a case where there are three or more objects, if the defocus amounts of two or more objects are reliable, the tilt/focus control unit 115 performs the focusing control in the focus-tilt calculation mode.

In a case where there are three or more objects, if the defocus directions of two or more objects are reliable, the tilt/focus control unit 115 selects the focus mode or the tilt mode depending on the defocus directions. If all the defocus directions match, the tilt/focus control unit 115 performs control in the focus mode. On the other hand, if the defocus directions do not match, the tilt/focus control unit 115 performs control in the tilt mode.

If defocus directions of less than two of the three or more objects are reliable, the tilt/focus control unit 115 performs control in the focus mode or the tilt mode. In a state where a defocus direction of one object is reliable and the one object is in focus, the tilt/focus control unit 115 selects the tilt mode, and in the other states, the tilt/focus control unit 115 selects the focus mode.

In a case where there are three or more objects, it is not always possible to perform the focusing control so that all the objects are in focus. All the objects become in focus only in a case where all the objects are on the same focal plane. However, in general, as compared to an object at a short distance, an object at a long distance has a deep depth of field for the tilt control, and thus if the focusing control is performed with priority given to the object at the short distance, it may be possible to perform focusing control that makes all the objects in focus. Therefore, in a case where the number of objects is three or more, the tilt/focus control unit 115 may cause the object determination unit 113 to set the two objects while giving the priority to two objects at short distances. After that, the tilt/focus control unit 115 may cause the focus detection unit 112 to detect the defocus information on each of the set two objects and may perform, on the set two objects, the above-described process of a case where there are two objects X and Y. Alternatively, two objects of interest for a user may be selected. As described above, when there are three or more objects, if two objects are selected, it is not necessary to detect defocus information for all the objects, and thereby a detection load can be reduced.

SECOND EMBODIMENT

Hereinafter, a description will be given of a process executed by an image pickup apparatus according to the second embodiment. The image pickup apparatus according to this embodiment has a total of four focus control modes including focus maintenance tilt mode (fourth mode) in addition to the focus mode (first mode), the tilt mode (second mode), and the focus-tilt calculation mode (third mode) of the image pickup apparatus of the first embodiment. Based on defocus information detected for each object by the focus detection unit 112 and its reliability, the tilt/focus control unit 115 performs focusing control on two objects while selecting an optimum focus control mode.

The focus maintenance tilt mode will be described. The focus maintenance tilt mode is a mode in which the tilt/focus control unit 115 performs focusing control by using a tilt driving unit so as to hinder a focus variation of a specific object of the two objects. In other words, the focus maintenance tilt mode is a mode in which the tilt/focus control unit 115 performs the focus control by driving the focus lens 102 while performing the tilt control so that the focal plane is rotated while the specific object is maintained in an in-focus state.

Figure 9A:
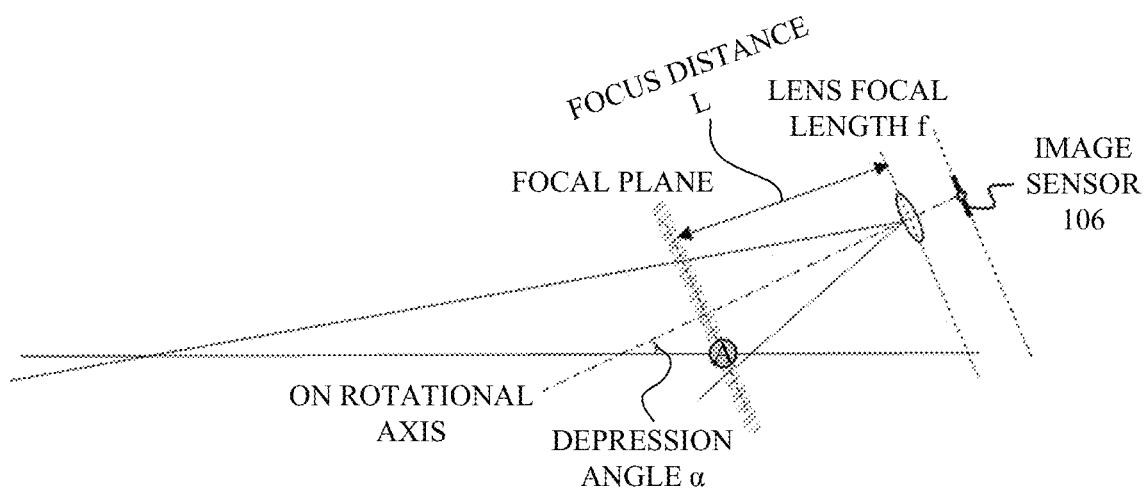
FIGS. 9A to 9C are diagrams illustrating a focus maintenance tilt mode.
Figure 9B:
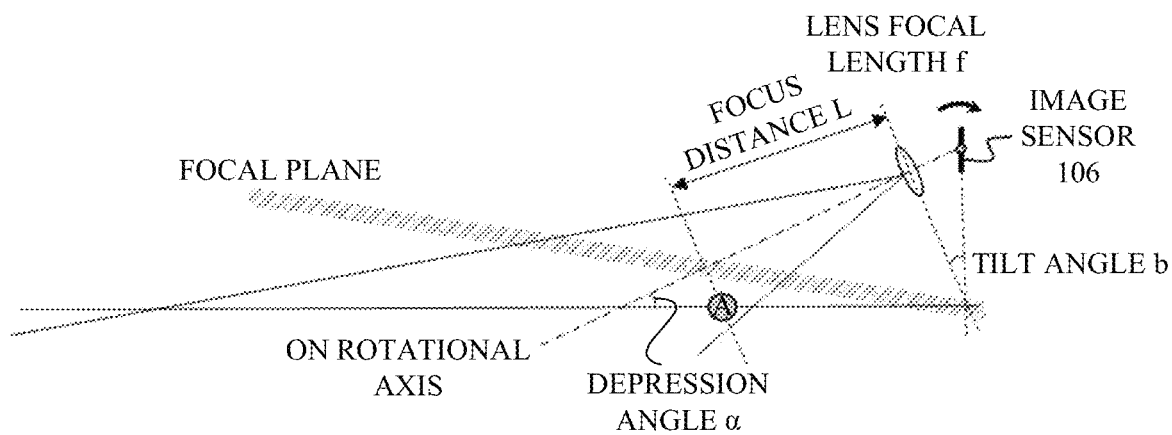
Figure 9C:
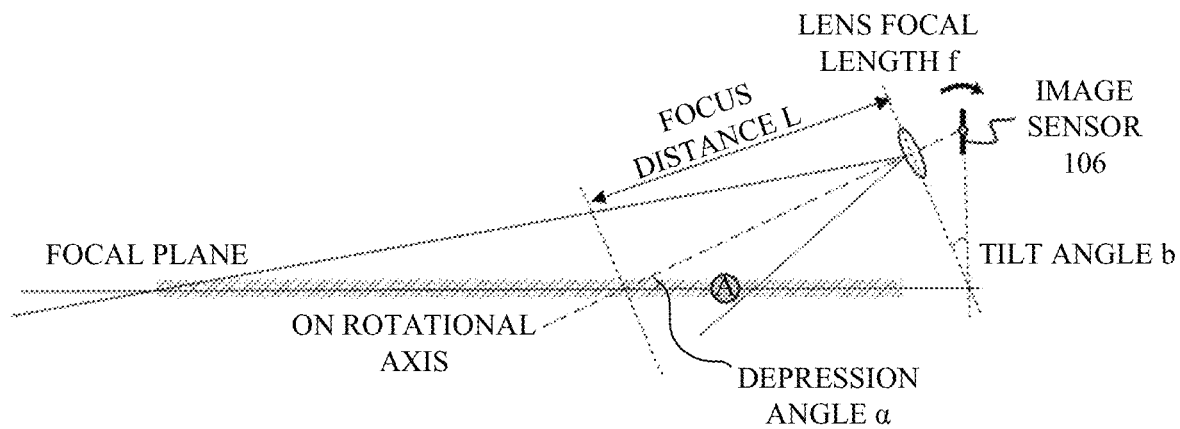
Figure 10:
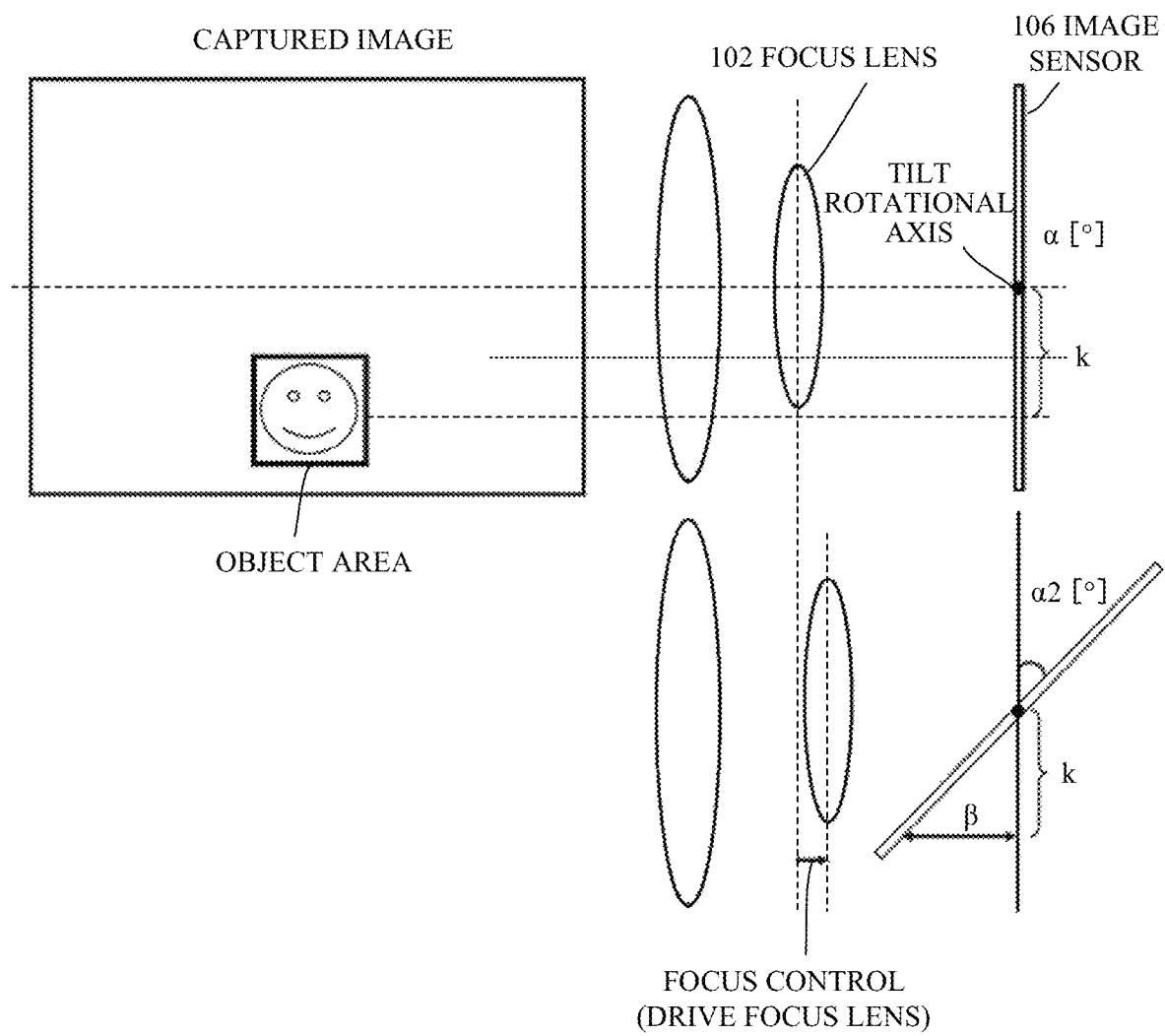
FIG. 10 is a diagram illustrating the focus maintenance tilt mode.

FIGS. 9A to 10 are explanatory diagrams illustrating the focus maintenance tilt mode. FIGS. 9A to 9C illustrate an example in which the tilt control is performed from a state in which an object at a point A is in focus. FIG. 9A illustrates a state in which the optical system and the image sensor 106 are parallel to each other. FIG. 9B illustrates a state in which the tilt control has been performed on the state of FIG. 9A. As described above, when the tilt control is performed, the focal plane rotates about a position corresponding to the tilt rotational axis. Therefore, the object at the point A that is not on the rotational axis deviates from the focal plane and becomes out of focus. If control is performed in a state where an object that is not on the tilt rotational axis is in focus, the focus control may be performed so that the object does not become out of focus. FIG. 9C illustrates a state in which the tilt control and the focus control have been performed on the state of FIG. 9A. By the focus control, the focal plane can be rotated while the focus state of the object at point A is maintained.

A description will be given of an example of calculating a focus correction amount in the focus control performed in accordance with the tilt control with reference to FIG. 10. The focus correction amount is calculated for maintaining the focus state even when the tilt control is performed for an object area in a captured image that is located on a lower side of a position of the rotational axis. Positional relationships between the focus lens 102 and the image sensor 106 before and after the tilt control are as illustrated in an upper part and a lower part of FIG. 10, respectively. In a case where k [μm] represents a distance on the image sensor 106 from the tilt axis to the object, and the image sensor 106 is driven by the tilt control so that the tilt angle becomes α2 [°] from α1 [°] (here, α1 [°] is 0 [°] because the image sensor 106 is parallel to the lens), a variation amount β on the focal plane represents the focus correction amount. This focus correction amount β is calculated by the following equation (8).

$$\beta = (\tan \alpha 2 - \tan \alpha 1) \times k \quad (8)$$

A specific description will be given of the control method of this embodiment. FIG. 11 is a list of control based on defocus information on each of two objects X and Y and its reliability. Hereinafter, only points different from the first embodiment will be described. In this embodiment, in a case where both the defocus amounts of the two objects X and Y are not reliable and the focus-tilt calculation mode is not available, if the defocus amount of one object is smaller than a predetermined value, i.e., the one object is in focus, the focus maintenance tilt mode is selected. In the focus maintenance tilt mode, it is possible to perform the focusing control on the other object while the in-focus object is hindered from being out of focus as described above. Therefore, in the second embodiment, in-focus quality is higher than the in-focus quality in the first embodiment.

Figure 12:
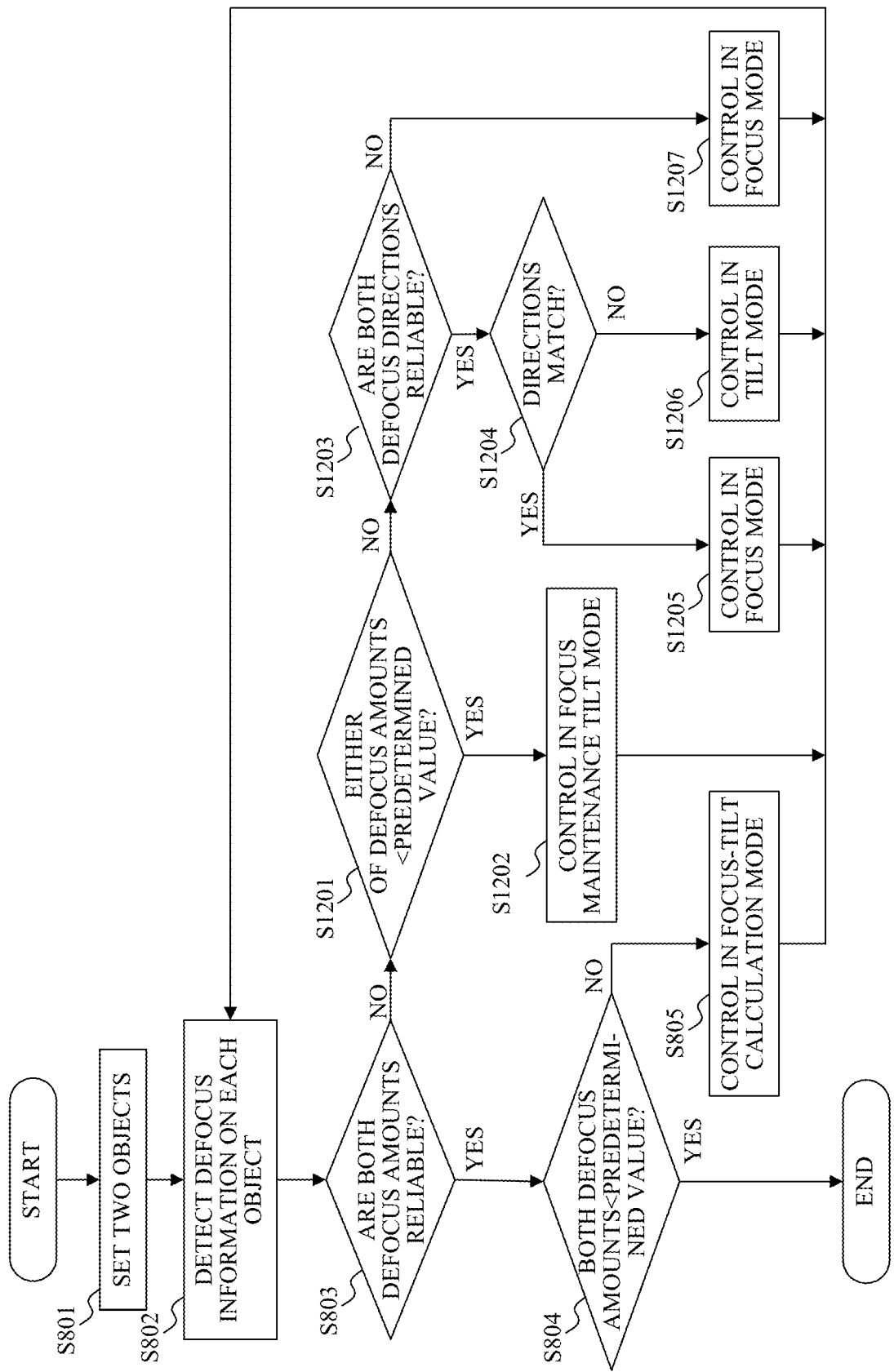
FIG. 12 is a flow chart of a process according to the second embodiment.

FIG. 12 is a flowchart illustrating the process in this embodiment described above. Parts similar to parts described in the first embodiment are designated by the same reference numerals, and a description thereof will be omitted.

If the determination result in step S803 is "no", the process proceeds to step S1201. In step S1201, the focus detection unit 112 determines whether or not the defocus amount of either of the two objects X and Y is smaller than the predetermined value. That is, the focus detection unit 112 determines whether or not there is an in-focus object. If there is an in-focus object, the process proceeds to step S1202, and the tilt/focus control unit 115 performs control in the focus maintenance tilt mode. After that, the process returns to step S802 again. As the tilt/focus control unit 115 continues to perform the control in the in-focus direction of the other object in the focus maintenance tilt mode in step S1202, it gradually becomes possible to acquire a reliable defocus amount of the other object, and a determination result of "yes" becomes more likely to be acquired in step S803.

If the determination result in step S1201 is "no", the process proceeds to step S1203. In step S1203, the focus detection unit 112 determines whether or not both the defocus directions detected for the two objects X and Y are reliable. If both the defocus directions are reliable, the process proceeds to step S1204. In step S1204, the focus detection unit 112 determines whether or not the detected defocus directions match. If the defocus directions match, the process proceeds to step S1205, and the tilt/focus control unit 115 performs control in the focus mode. If the defocus directions do not match, the process proceeds to step S1206, and the tilt/focus control unit 115 performs control in the tilt mode. After that, the process returns to step S802 again. As the tilt/focus control unit 115 continues to perform the control in the in-focus direction in the focus control mode of step S1205 or step S1206, it gradually becomes possible to acquire a reliable defocus amount of each object, and a determination result of "yes" becomes more likely to be acquired in step S803 or step S1201.

If the determination result in step S1203 is "no", the process proceeds to step S1207, and the tilt/focus control unit 115 performs control in the focus mode. After that, the process returns to step S802 again. As the tilt/focus control unit 115 continues to perform the control in the in-focus direction in the focus mode in step S1207, it gradually becomes possible to acquire a reliable defocus amount of each object. In addition, a defocus direction can be acquired by acquiring a defocus variation and a contrast variation. Thereby, a determination result of "yes" becomes more likely to be acquired in step S803, step S1201, or step 1203.

In the second embodiment described above, the defocus information on the two objects is detected, and the focusing control is performed while, based on the reliability of the defocus information, the mode is switched between the four focus control modes of the focus mode, the tilt mode, the focus-tilt calculation mode, and the focus maintenance tilt mode. In the second embodiment, in the focus maintenance tilt mode, the focusing control can be performed on an object that is not in focus while an in-focus object is prevented from being out of focus, and thus the in-focus quality is higher than the in-focus quality in the first embodiment.

In the second embodiment, the case where the number of objects is two is described, but the number of objects may be three or more. In a case where a defocus amount of one of three or more objects is reliable and the one object is in focus, the tilt/focus control unit 115 performs control in the focus maintenance tilt mode. In the other cases, similar processes are applied as in the first embodiment.

THIRD EMBODIMENT

Hereinafter, a description will be given of a process executed by an image pickup apparatus according to the third embodiment. In the image pickup apparatus according to this embodiment, a focusing control stop process for a case where a defocus amount cannot be sufficiently reduced or the defocus amount cannot be detected is added to the image pickup apparatus described in the first embodiment or the second embodiment.

Figure 13:
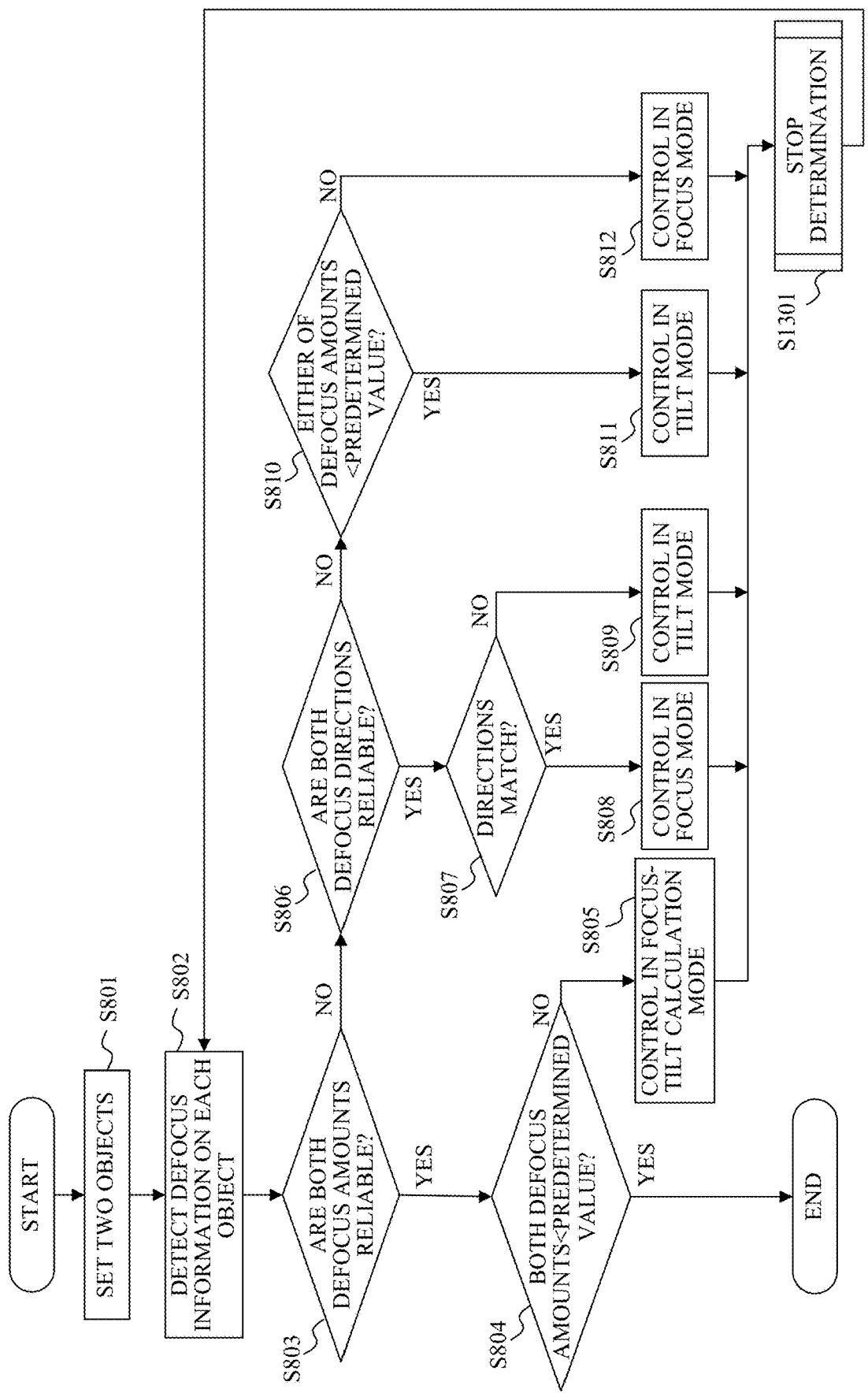
FIG. 13 is a flow chart of a process according to a third embodiment.
Figure 14:
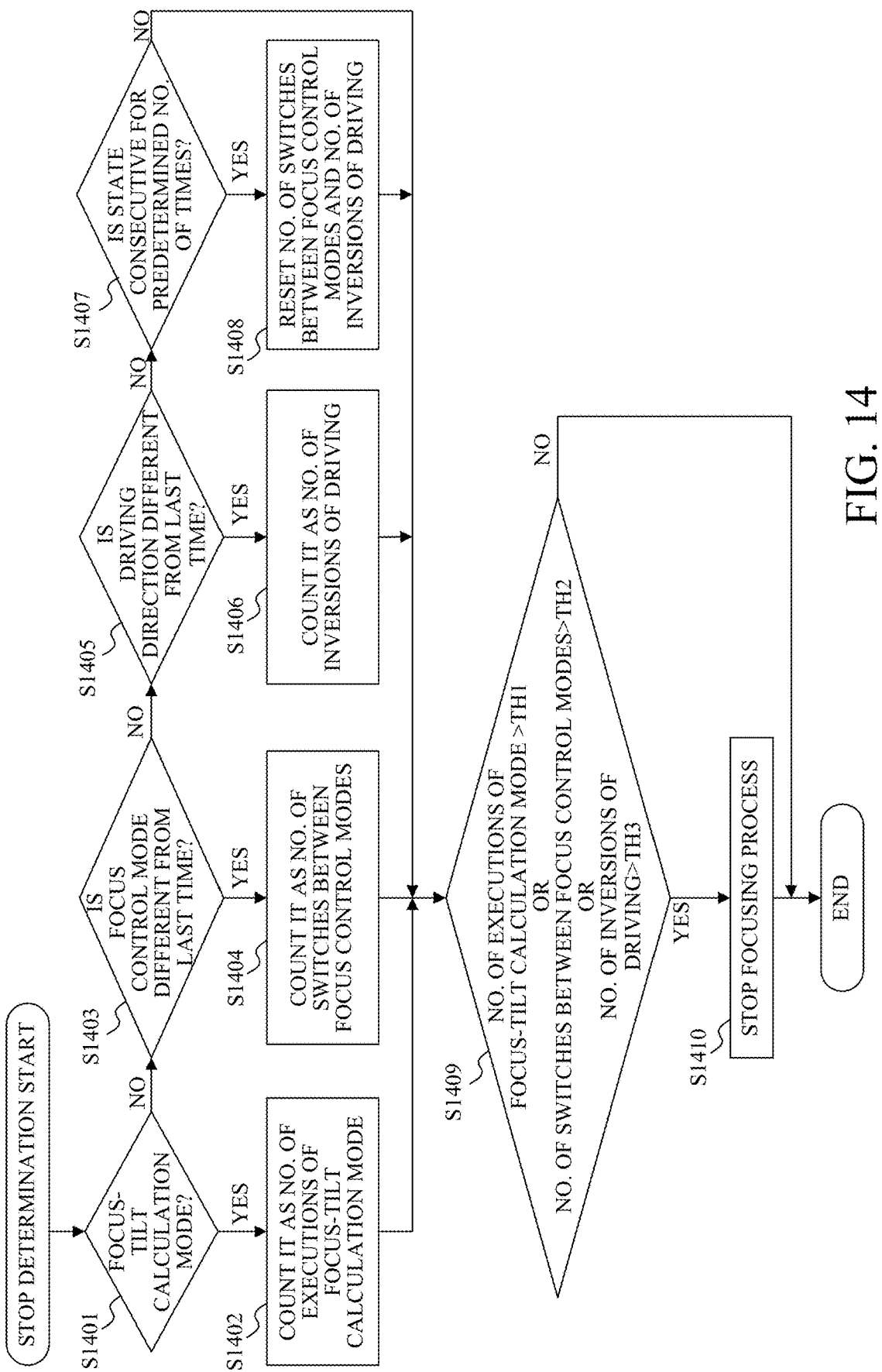
FIG. 14 is a flow chart of a process according to the third embodiment.

FIGS. 13 and 14 are flowcharts illustrating processes in this embodiment. The same reference numerals are given to similar processes as in the first embodiment, and a description thereof will be omitted.

First, a description will be given with reference to FIG. 13. After the control is executed in various focus control modes in step S805, step S808, step S809, step S811, and step S812, the process shifts to the stop determination of the focusing process in step S1301. FIG. 14 illustrates a specific process of the stop determination in step S1301.

First, in step S1401, a determination is made on whether or not a focus control mode is the focus-tilt calculation mode. If the focus control mode is the focus-tilt calculation mode, it is counted as the number of executions of the focus-tilt calculation mode in step S1402. In the focus-tilt calculation mode, control is performed such that a calculated defocus amount becomes zero, but for example, depending on a lack of accuracy of a driving system or on a threshold setting, even when the control is repeated many times, the defocus amount may not become smaller than the predetermined value and the focusing control may not be ended. For this reason, the number of executions of the focus-tilt calculation mode is counted so that the counted number can be used in the stop determination later (step S1409).

If it is determined in step S1401 that the focus control mode is not the focus-tilt calculation mode (that is, if the focus control mode is the focus mode or the tilt mode), it is determined in step S1403 whether or not the focus control mode is different from a focus control mode of last time. If the focus control mode is different from the focus control mode of the last time, it is counted as the number of switches between the focus control modes in step S1404. If the focus control mode is frequently switched, it is considered that hunting occurs near an in-focus area. Therefore, the number of switches between the focus control modes is counted so that the counted number can be used in the stop determination later (step S1409).

If it is determined in step S1403 that the focus control mode is the same as the focus control mode of the last time (that is, if the focus control mode is maintained in the focus mode or the tilt mode), it is determined in step S1405 whether or not the driving direction is different from a driving direction of the last time. If the driving direction is different from the driving direction of the last time, it is counted as the number of inversions of the focus driving or the tilt driving in step S1406. If the focus driving or the tilt driving is frequently inverted, it is considered that hunting occurs near the in-focus area. Therefore, the number of the inversions is counted so that the counted number can be used in the stop determination later (step S1409).

If it is determined in step S1405 that the driving direction is the same as the driving direction of the last time, it is further determined in step S1407 whether or not this state is consecutive for a predetermined number of times. If the state is maintained, the driving in the same direction may be continuing in the focus mode or the tilt mode and the state may be in a process to be in focus (not near the in-focus area). Therefore, in step S1408, the number of switches between the focus control modes and the number of inversions are reset to zero.

In step S1409, it is determined whether to stop the focusing process (stop determination). Specifically, the number of the executions of the focus-tilt calculation mode, the number of the switches between the focus control modes, and the number of the inversions of the focus driving or the tilt driving counted in step S1402, step S1404, and step S1406, respectively, are compared with respective threshold values (TH1, TH2, and TH3). If any of the counted numbers exceed the threshold value, it is determined to stop the focusing process, and the focusing process is stopped in step S1410.

In the third embodiment described above, the focusing control stop process is added, the focusing control stop process being performed in a case where the defocus amount cannot be reduced sufficiently or the defocus amount cannot be detected. As a result, the focusing control is not unnecessarily continued, which provides an effect of preventing the hunting of focus variation and improving durability of a driving unit.

In addition to these, various modifications are available as the process of ending the focusing control.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, it is possible to provide an image pickup apparatus that can focus on a plurality of objects at high speed and with high accuracy by performing optimum focusing control based on defocus information on the plurality of objects While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2021-072186, filed on Apr. 21, 2021, and 2021-177256, filed on Oct. 29, 2021, which are hereby incorporated by reference herein in their entirety.

What is claimed is:

1. An image pickup apparatus comprising:
    a tilt driving portion that changes a tilt of at least one of an image sensor and an image pickup optical system so as to change an angle between an image pickup plane of the image sensor and a principal plane of the image pickup optical system;
    a focus driving portion that drives a focus lens of the image pickup optical system;
    at least one processor; and
    at least one memory coupled to the at least one processor storing instructions that, when executed by the at least one processor, cause the at least one processor to function as:
        an area setting unit configured to set a plurality of areas in a captured image;
        a defocus information detection unit configured to detect defocus information for each of the plurality of areas; and
        a control unit configured to select one control mode from a plurality of control modes based on the defocus information on each of the plurality of areas, the plurality of control modes being used for performing focusing control using at least one of the tilt driving portion and the focus driving portion
    wherein the plurality of control modes include at least three modes of:
        a first mode in which the focusing control is performed by controlling the focus driving portion;
        a second mode in which the focusing control is performed by controlling the tilt driving portion;
        a third mode in which the focusing control is performed by controlling the tilt driving portion and the focus driving portion based on respective target values of a focus position and a tilt angle, the target values being calculated based on the defocus information; and
        a fourth mode in which the focusing control is performed, while maintaining an in-focus state of a specific area of the plurality of areas, by simultaneously controlling the tilt driving portion and the focus driving portion.

2. The image pickup apparatus according to claim 1, wherein in a case where defocus amounts are reliable in two or more areas among the plurality of areas, the control unit performs the focusing control in the third mode.

3. The image pickup apparatus according to claim 1, wherein in a case where defocus directions are reliable in two or more areas among the plurality of areas, the control unit:
    performs the focusing control in the first mode if the defocus directions in the two or more areas match; and
    performs the focusing control in the second mode if the defocus directions in the two or more areas do not match.

4. The image pickup apparatus according to claim 1, wherein in a case where defocus directions are reliable in less than two areas among the plurality of areas, the control unit performs the focusing control in the first mode or the second mode.

5. The image pickup apparatus according to claim 1, wherein in a case where a defocus direction is reliable only in one area among the plurality of areas, if a defocus amount in the one area is reliable and is smaller than a predetermined value, the control unit performs the focusing control in the second mode.

6. The image pickup apparatus according to claim 1, wherein in a case where a defocus amount is reliable only in one area among the plurality of areas, if the defocus amount in the one area is smaller than a predetermined value, the control unit performs the focusing control in the fourth mode.

7. The image pickup apparatus according to claim 1, wherein if all of defocus amounts in the plurality of areas are smaller than a predetermined value, the control unit ends the focusing control.

8. The image pickup apparatus according to claim 1, wherein if a predetermined time has elapsed since a start of the focusing control, the control unit ends the focusing control.

9. The image pickup apparatus according to claim 1, wherein the defocus information includes a defocus amount and a defocus direction.

10. The image pickup apparatus according to claim 1, wherein the number of the plurality of areas is two.

11. The image pickup apparatus according to claim 1, wherein the control unit:
    causes the area setting unit to set two areas among the plurality of areas;
    causes the defocus information detection unit to detect defocus information for each of the two areas; and
    selects one control mode from the plurality of control modes based on the defocus information on each of the two areas.

12. The image pickup apparatus according to claim 1, wherein if the focusing control has been executed in the third mode predetermined times or more, the control unit ends the focusing control.

13. The image pickup apparatus according to claim 12, wherein if the plurality of control modes have been switched predetermined times or more, the control unit ends the focusing control.

14. The image pickup apparatus according to claim 13, wherein if defocus directions in all the plurality of areas have been inverted predetermined times or more, the control unit ends the focusing control.

15. The image pickup apparatus according to claim 14, wherein if at least one of the focus driving portion and the tilt driving portion has been inverted predetermined times or more, the control unit ends the focusing control.

16. The image pickup apparatus according to claim 15, wherein in a case where driving is consecutively performed in a same direction in the first mode or the second mode predetermined times or more, the control unit resets at least one of the number of switches between the plurality of control modes, the number of inversions of the defocus direction, and at least one of the numbers of inversions of the focus portion and tilt driving portion.

17. A control method of an image pickup apparatus including a tilt driving portion that changes a tilt of at least one of an image sensor and an image pickup optical system so as to change an angle between an image pickup plane of the image sensor and a principal plane of the image pickup optical system and a focus driving portion that drives a focus lens of the image pickup optical system, the control method comprising:

setting a plurality of areas in a captured image;

detecting defocus information for each of the plurality of areas; and selecting one control mode from a plurality of control modes based on the defocus information on each of the plurality of areas, the plurality of control modes being used for performing focusing control using at least one of the tilt driving portion and the focus driving portion, wherein the plurality of control modes include at least three modes of:

a first mode in which the focusing control is performed by controlling the focus driving portion;

a second mode in which the focusing control is performed by controlling the tilt driving portion;

a third mode in which the focusing control is performed by controlling the tilt driving portion and the focus driving portion based on respective target values of a focus position and a tilt angle, the target values being calculated based on the defocus information; and a fourth mode in which the focusing control is performed, while maintaining an in-focus state of a specific area of the plurality of areas, by simultaneously controlling the tilt driving portion and the focus driving portion.

18. A non-transitory computer-readable storage medium storing a computer program that causes a computer to execute a control method according to claim 17.

* * * * *